United States Patent [19]

Crosson, Jr.

[11] Patent Number: 5,678,700
[45] Date of Patent: Oct. 21, 1997

[54] REEL AND ROD HANGER

[76] Inventor: Oliver J. Crosson, Jr., 2205 Belegarde, Bay City, Tex. 77414-8509

[21] Appl. No.: 607,658

[22] Filed: Feb. 27, 1996

[51] Int. Cl.[6] .................................................. A47B 81/00
[52] U.S. Cl. .................................. 211/70.8; 211/60.1
[58] Field of Search ........................... 211/70.8, 70.6, 211/87, 60.1; 248/511, 512, 539; 43/21.2; 224/922

[56] References Cited

U.S. PATENT DOCUMENTS

| | | | |
|---|---|---|---|
| 3,063,569 | 11/1962 | Huber | 211/89 |
| 3,095,092 | 6/1963 | Magarian | 211/89 |
| 3,537,595 | 11/1970 | Mathisen | 211/70.8 |
| 4,003,612 | 1/1977 | Munsell | 211/70.8 |
| 4,049,126 | 9/1977 | Halverson | 211/60.1 |
| 4,286,717 | 9/1981 | Liesinger | 211/89 |
| 4,325,484 | 4/1982 | Berry | 211/70.8 |
| 4,583,647 | 4/1986 | Schinzing | 211/87 |
| 4,854,456 | 8/1989 | Lee | 211/70.8 |
| 4,856,221 | 8/1989 | Thompson | 211/70.8 |
| 4,881,674 | 11/1989 | Medianik | 211/70.8 |

FOREIGN PATENT DOCUMENTS

| 3004312 | 8/1981 | Germany | 211/60.1 |
|---|---|---|---|

*Primary Examiner*—Leslie A. Braun
*Assistant Examiner*—Donald J. Wallace
*Attorney, Agent, or Firm*—Michael I. Kroll

[57] ABSTRACT

A reel and rod hanger (26) which comprises a bracket (28). A facility (30) in the bracket (28) is for holding a plurality of fishing rods (10) and reels (12) in inverted positions with the tips of the fishing rods (10) extending down. A structure (32) is for mounting the bracket (28) to a vertical support (34). Any moisture on the fishing rods (10) and reels (12) will flow away from the reels (12), down the fishing lines (22) towards the tips of the fishing rod (12) to keep moisture out of the housings (24) of the reels (12) and prevent corrosion from setting in.

5 Claims, 2 Drawing Sheets

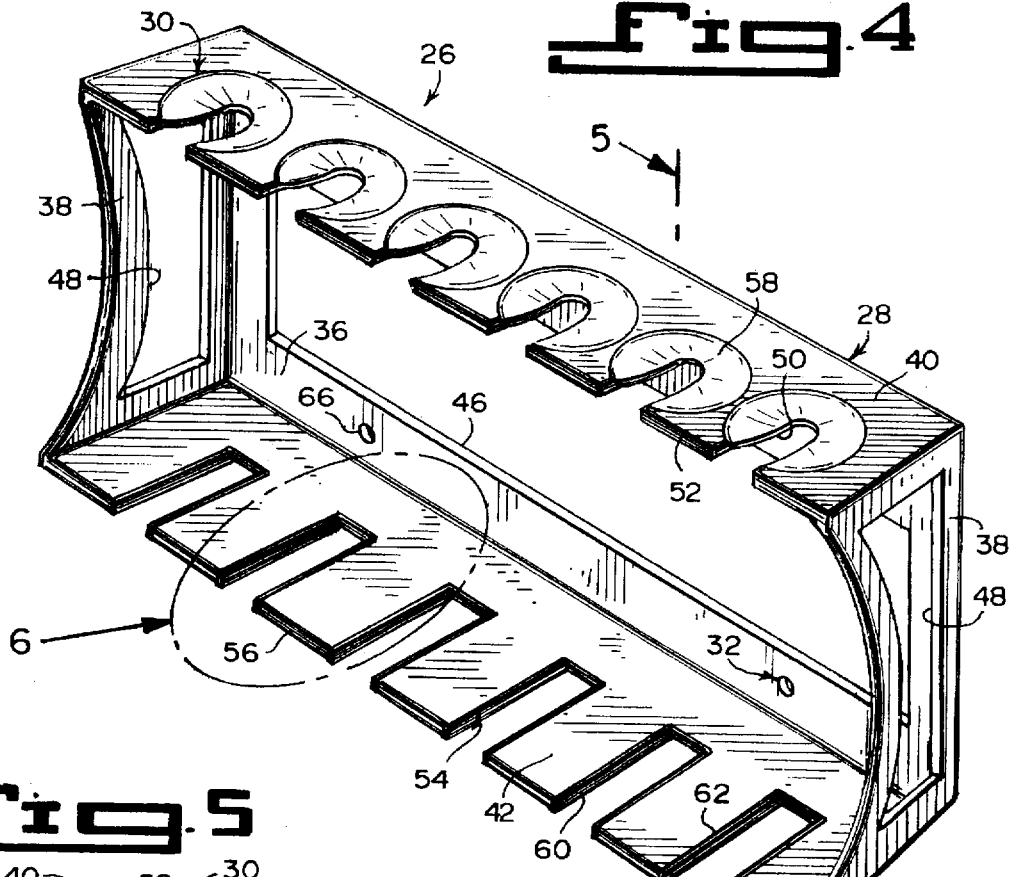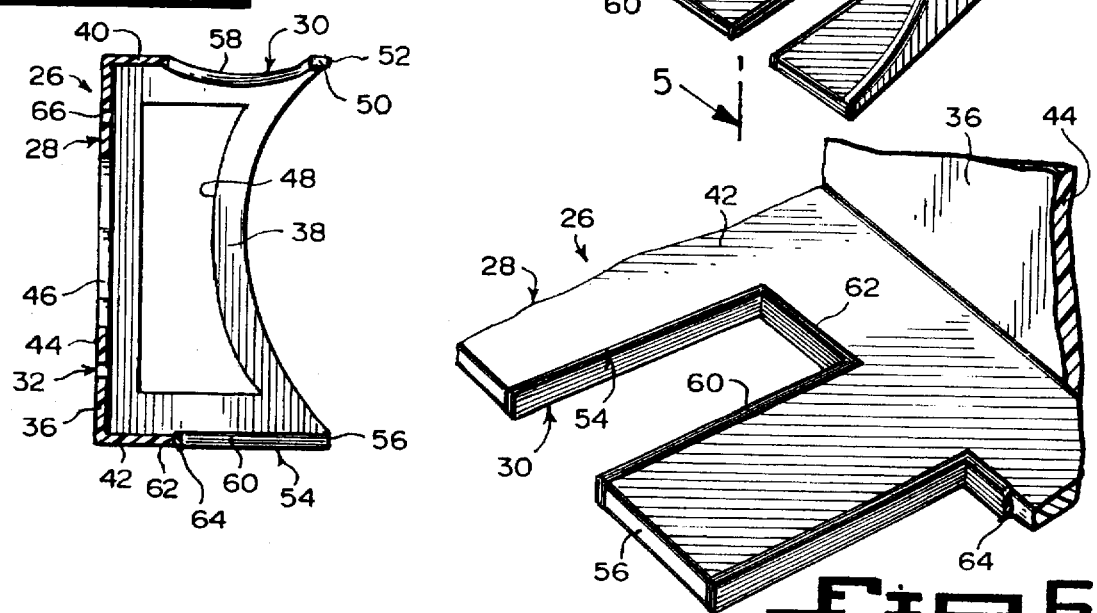

REEL AND ROD HANGER

BACKGROUND OF THE INVENTION

1. Field of the Invention

The instant invention relates generally to fishing gear and more specifically it relates to a reel and rod hanger.

2. Description of the Prior Art

Numerous supports for fishing gear have been provided in prior art that are adapted to be used by fisherman to assist them in catching fish. While these units may be suitable for the particular purpose to which they address, they would not be as suitable for the purposes of the present invention as herinafter described.

SUMMARY OF THE INVENTION

A primary object of the present invention is to provide a reel and rod hanger that will overcome the shortcomings of the prior art devices.

Another object is to provide a reel and rod hanger that will hold a plurality of fishing rods with reels inverted and elevated upon a wall, so that any moisture within the reels will flow downwardly out of the reel, to reduce corrosion from setting in.

An additional object is to provide a reel and rod hanger that will conveniently store the fishing rods upon the wall, so that the fishing rods will be ready for use.

A further object is to provide a reel and rod hanger that is simple and easy to use.

A still further object is to provide a reel and rod hanger that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIGURE 4 is an enlarged perspective view of the instant invention per se taken in the direction of arrow 4 in FIG. 3.

FIG. 5 is a cross sectional view taken along line 5—5 in FIG. 4.

FIG. 6 is a further enlarged perspective view of the area indicated by arrow 6 in FIG. 4, showing the soft rubber padding within the bottom slots in greater detail.

Similar reference characters denote corresponding features consistently throughout the attached drawings.

DETAILED DESCRIPTION OF THE PREFERRED EMBODIMENTS

Figure 1:
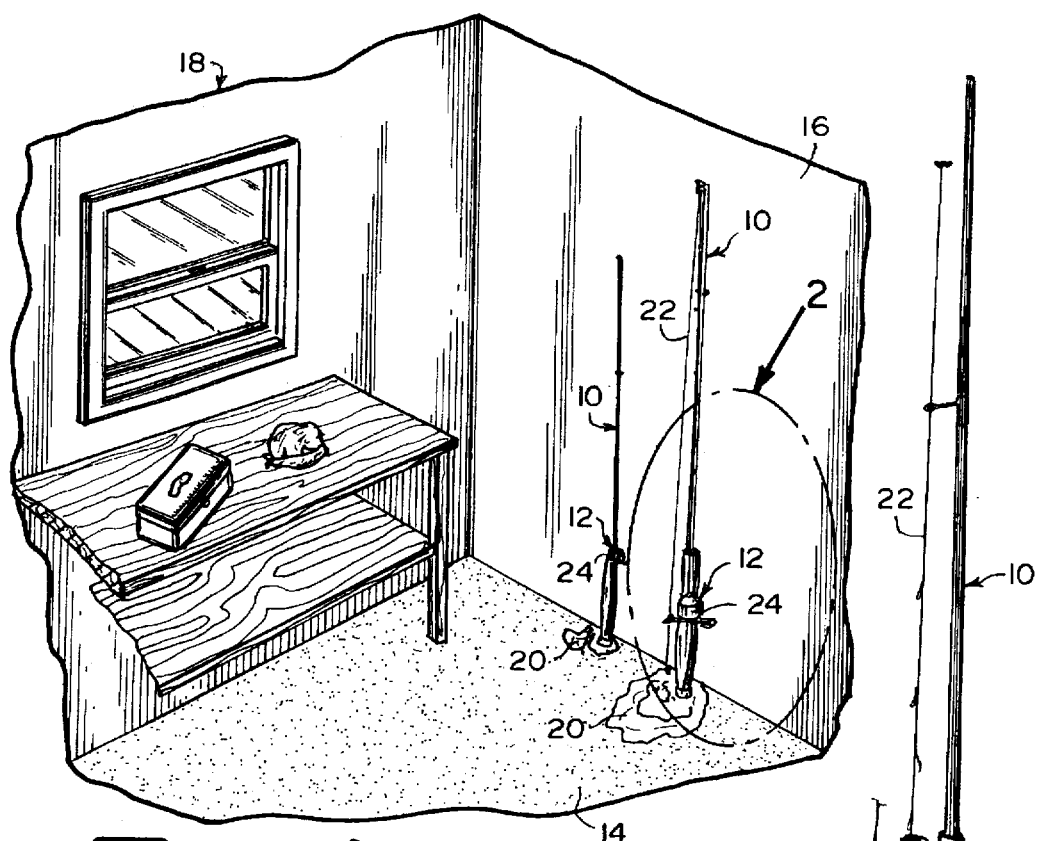
FIG. 1 is a perspective view of the prior art being fishing rods with reels placed in an upright vertical position within a room of a building.
Figure 2:
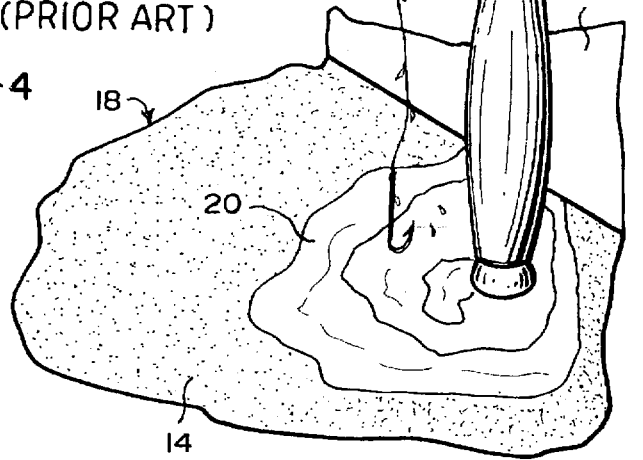
FIG. 2 is an enlarged perspective view of the area in the prior art indicated by arrow 2 in FIG. 1, showing water dripping down the rod into the reel casing and onto the floor.
Figure 3:
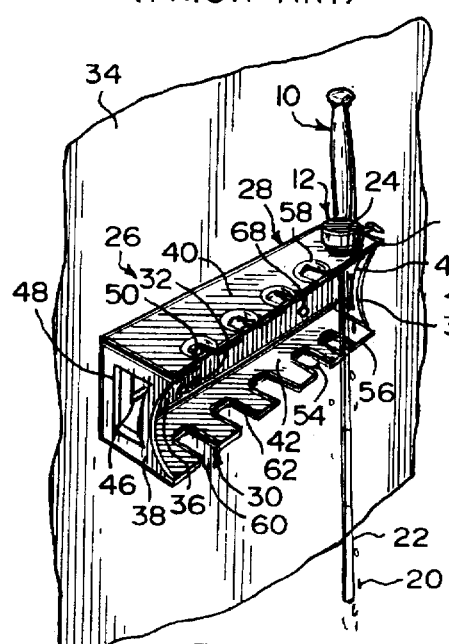
FIG. 3 is a perspective view of the instant invention mounted to a wall to store fishing rods with reels in inverted positions thereon.

Turning now descriptively to the drawings, in which similar reference characters denote similar elements throughout the several views, FIGS. 1 and 2 illustrate the prior art. Fishing rods 10 and reels 12 are shown in upright positions standing on a floor 14 against a wall 16 in a building 18. Water 20 is dripping down fishing lines 22 into housing 24 of the reels 12 and onto the floor 14.

FIGS. 3 through 6 show the instant invention which is a reel and rod hanger 26, which comprises a bracket 28. A facility 30 in the bracket 28 is for holding a plurality of fishing rods 10 and reels 12 in inverted positions with the tips of the fishing rods 10 extending down. A structure 32 is for mounting the bracket 28 to a vertical support 34, such as a wall. Any moisture on the fishing rods 10 and reels 12 will flow away from the reels 12, down the fishing lines 22 towards the tips of the fishing rods 10, to keep moisture out of the housing 24 of the reels 12 and prevent corrosion from setting in.

The bracket 28 includes a back wall 36. A pair of side walls 38 extend from the back wall 36. A top wall 40 extends from the back wall 36. A bottom wall 42 extends from the back wall 36.

The bracket 28 is fabricated out of a durable strong, lightweight, non-corrosive material 44, which is plastic. The back wall 36 has a cutout area 46. The side walls 38 each have a cutout area 48, so as to make the bracket 28 lighter.

The holding facility 30 includes the top wall 40 of the bracket 28 having a plurality of top slots 50 spaced apart and extending inwardly from a front edge 52, so that each top slot 50 will receive one inverted reel 12 thereon. The bottom wall 42 of the bracket 28 has a plurality of bottom slots 54 spaced apart and extending inwardly from a front edge 56, so that each bottom slot 54 will received one inverted fishing rod 10 therein.

The top wall 40 of the bracket 28 further includes a plurality of indented bowls 58. Each indented bowl 58 is formed about each top slot 50, so as to keep the inverted reel 12 from sliding off of the top slot 50. The bottom wall 42 of the bracket 28 further includes padding 60 on each side 62 of each bottom slot 54, so as to keep the inverted fishing rod 10 from sliding out of the bottom slot 54.

The padding 60 is fabricated out of a soft rubber material 64. The mounting structure 32 consists of the bracket 28 having a plurality of holes 66 formed in the back wall 36, so that fasteners 68 can be inserted through the holes 66 and into the vertical support 34.

Operation of the Invention

To use the reel and rod hanger 26, the following steps should be taken:

1. Position the back wall 36 of the bracket 28 horizontally against the vertical support 34, with the top wall 40 facing up and the bottom wall 42 facing down.
2. Drive each fastener 68 through each hole 66 in the back wall 36 of the bracket 28 and into the vertical support 34.
3. Put each fishing rod 10 in an inverted position, so that the inverted reel 12 will sit in one indented bowl 58 about one top slot 50 in the top wall 40 and the inverted fishing rod 10 will extend through one bottom slot 54 in the bottom wall 42.

4. Allow all of the water 20 to flow down the fishing line 22 and away from the housing 24 of the reel 12.

List of Reference Numbers 10 fishing rod
12 reel on 10
14 floor of 18
16 wall of 18
18 building
20 water
22 fishing line of 10
24 housing of 12
26 reel and rod hanger
28 bracket of 26
30 holding facility of 26
32 mounting structure of 26
34 vertical support
36 back wall of 28
38 side wall of 28
40 top wall of 28
42 bottom wall of 28
44 durable, strong, lightweight, non-corrosive material for 28
46 cutout area in 36
48 cutout area in 38
50 top slot in 40
52 front edge of 40
54 bottom slot in 42
56 front edge of 42
58 indented bowl about 50 on 40
60 padding on 62
62 side of 54
64 soft rubber material for 60
66 hole in 36 of 32
68 fastener of 32

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A fishing reel and rod hanger which comprises:

a) a bracket for use with and for supporting a plurality of fishing rods and reels, said bracket comprising a back wall, a pair of side walls extending from said back wall, a top wall extending from said back wall, and a bottom wall extending from said back wall;

b) holding means in said bracket for holding each fishing rod in an inverted position with the tip thereof extending down, said holding means including within the top wall of said bracket a plurality of top slots spaced apart and extending inwardly from a front edge, the top surface of said top wall having formed within and around each of said top slots an indented, concave shaped bowl for receiving and on which may be positioned a reel mounted on a fishing rod wherein said reel adapted to support said rod with said rod extending down through the top slot, and said bottom wall of said bracket having a plurality of bottom slots spaced apart and extending inwardly from a front edge for receiving the lower portion of said rod, the sides of said bottom slots being lined with padding to keep the inverted fishing rod from sliding out of the bottom slot; and c) means for mounting said bracket to a vertical support, so that any moisture on the fishing rods and reels will flow away from the reels, down the fishing lines towards the tips of the fishing rods to keep moisture out of the housing of the reels and prevent corrosion from setting in.

2. A fishing reel and rod hanger as recited in claim 1, wherein said bracket is fabricated out of a durable, strong, lightweight, non-corrosive material.

3. A fishing reel and rod hanger as recited in claim 2, wherein said material is plastic.

4. A fishing reel and rod hanger as recited in claim 1, further including:

a) said back wall having a cutout area; and b) said side walls having a cutout area, so as to make said bracket lighter.

5. A fishing reel and rod hanger as recited in claim 1, wherein said padding is fabricated out of a soft rubber material.

* * * * *